United States Patent [19]

Norman

[11] Patent Number: 5,478,629
[45] Date of Patent: Dec. 26, 1995

[54] POLYMERIC SHEETS AND LAMINAS HAVING HIGH FLEXURAL DURABILITY

[75] Inventor: Donald E. Norman, Newcomerstown, Ohio

[73] Assignee: GenCorp Inc., Fairlawn, Ohio

[21] Appl. No.: 184,126

[22] Filed: Jan. 21, 1994

[51] Int. Cl.$^6$ .................................................. B32B 3/00
[52] U.S. Cl. .................... 428/200; 428/204; 428/421; 428/518; 428/916; 283/94; 283/904
[58] Field of Search ................................. 428/916, 200, 428/204, 13; 283/94, 904

[56] References Cited

U.S. PATENT DOCUMENTS 4,133,926  1/1979  Vorrier et al. ..................... 428/200

OTHER PUBLICATIONS

Applicants's Disclosure Statement Sep. 30, 1994.

*Primary Examiner*—Edith Buffalow
*Attorney, Agent, or Firm*—Robert F. Rywalski; Daniel J. Hudak

[57] ABSTRACT

Polymeric blends suitable for making plastic sheets and laminas which exhibit improved flexural durability while retaining stiffness and impact strength include a core made from a blend comprising polyvinyl chloride resin, a vinyl chloride-vinyl ester copolymer, one or more acrylic polymers or copolymers, a chlorinated polyolefin, a solid tin stabilizer, and one or more ester waxes. The lamina, which is suitable for use as an extended life credit card, is prepared by forming a polymeric blend of a core material into a base layer sheet material which is subsequently treated to reduce surface tension and improve ink adhesion thereto, then printed with desired indicia, and finally provided with a contact-transparent protective overlay which is laminated thereto. The protective layer is a sheet material made from either a polymer or copolymer such as polyvinyl fluoride, or a polymer blend comprising essentially the same components of the core material but utilizing a different tin stabilizer and including the use as an ultra-violet light stabilizer. The overlay polymer blend material is very compatible with the core material and has good flex life.

10 Claims, 3 Drawing Sheets

POLYMERIC SHEETS AND LAMINAS HAVING HIGH FLEXURAL DURABILITY

FIELD OF INVENTION

The invention relates to polymeric blends which can be formed into ink-receptive plastic sheet materials exhibiting good flexural durability (the ability to withstand repeated flexing without cracking, i.e., flex life) and resilience, and to lamina comprised of multiple layers of such plastic sheet materials. More particularly, the invention relates to durable laminated articles having an ink-receptive core layer onto which desired indicia are printed, and a outer protective transparent layer laminately affixed to each side of the core layer to prevent ink wear.

BACKGROUND

Plastic sheet laminas are commonly used as identification cards, desirably monetary I.D. cards such as credit cards, bank cards, season passes, identification cards, and the like. Such laminas are generally comprised of a relatively thick core layer and printed using offset or silk screen methods, and subsequently protected by a pair of relatively thin, transparent layers laminately joined to each side of the core layer. For certain applications, particularly for credit cards, the lamina is embossed and the raised areas are typically printed or tipped with ink. It is desirable that the finished card be relatively stiff and durable.

Heretofore, such laminas have been generally made of plastic sheets comprised of various thermoplastic blends containing primarily polyvinyl chloride homopolymers or copolymers. Previous credit card laminas have properties such as stiffness, impact strength, resilience and flexural durability only sufficient to provide about a one to two-year service life. However, a three to five year service life, would provide credit institutions with a substantial savings, and would therefore be highly desirable.

SUMMARY OF THE INVENTION

The present invention relates to polymeric core blends which can be processed into relatively stiff, high impact resilient, ink-receptive sheet materials having excellent flexural resilience and improved flexural durability, and to similar polymeric overlay blends having all of the foregoing properties and which also exhibit contact clarity when processed into relatively thin sheet materials.

The core of the lamina of the invention is formed from a thermoplastic polymeric blend comprising a polyvinyl chloride which is substantially a homopolymer; a copolymer of vinyl chloride and vinyl ester units; one or more polymers or copolymers of the acrylic class, a chlorinated polyolefin; solid tin stabilizers; and various ester waxes. It has been discovered that the foregoing polymeric components, when properly blended in appropriate relative amounts and with various conventional additives in accordance with the concepts of the invention will provide a core layer having the desired stiffness, impact strength and other desired properties while achieving unexpected improvement in flexural durability.

Further, it has been discovered that the above polymeric components can also be blended in slightly different relative amounts and generally with a U.V. stabilizer to provide outer protective layers having the desired contact clarity, impact strengths and other required properties.

Alternatively, the outer layers can be formed from various thermoplastics such as polyester polymers, from polyvinyl chloride polymers, or from copolymers of vinyl chloride and vinyl acetate, and when prepared from various vinyl fluoride polymers, have unexpected improvements in flexural durability.

DETAILED DESCRIPTION OF PREFERRED EMBODIMENTS

Figure 1:
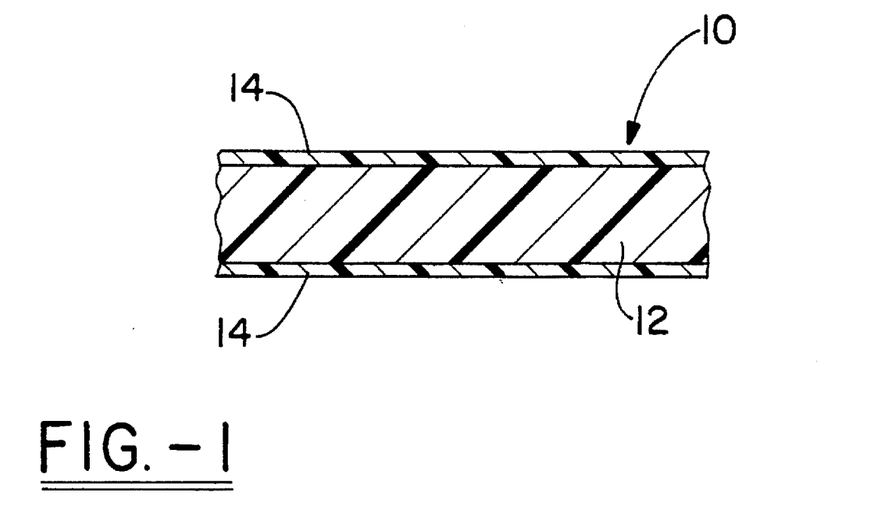
FIG. 1 shows a cross-section of the layers comprising the plastic sheet lamina of the invention.

The plastic sheet lamina 10 of the invention, as shown in FIG. 1, includes a generally relatively thick core layer 12 and a pair of generally relatively thin outer protective layers 14 laminately affixed to each side of the core layer. The thickness of the core layer 12 is not critical, but generally is much thicker than the outer layers 14.

For credit cards, it is generally desirable that the lamina 10 be as thin as possible while retaining the desired stiffness and durability. Suitable thicknesses for the core layer 12 range from about 10 mils to about 33 mils with a thickness of from about 12 mils to about 28 mils being preferred.

Figure 2:
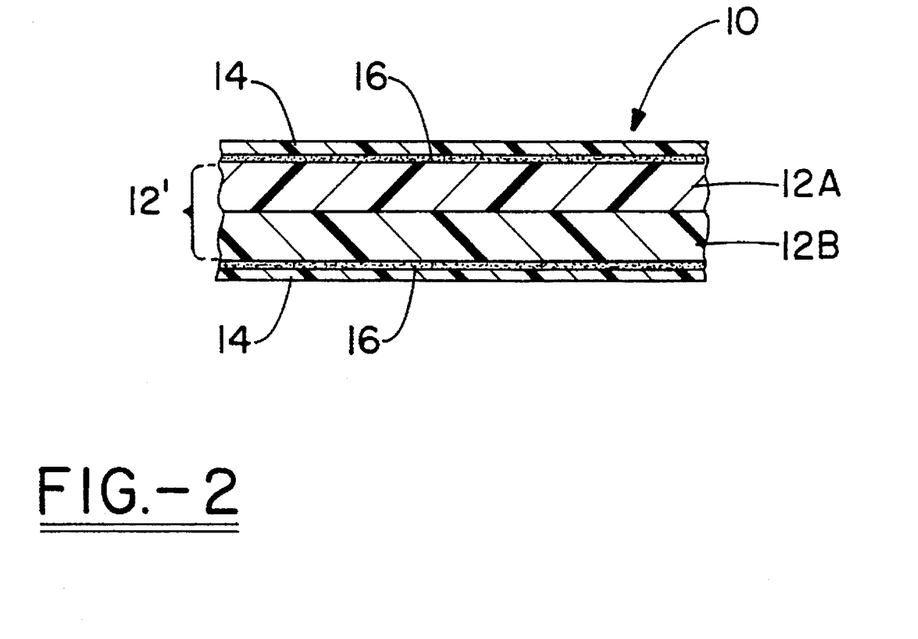
FIG. 2 shows an alternative embodiment wherein the core layer is comprised of a plurality of individual layers laminated together.

The core can be comprised of a single extruded or calendered layer 12 of the desired thickness as shown in FIG. 1, or can be comprised of a plurality of thin sublayers, e.g., layers 12a and 12b, which are laminated together to form a core 12' as shown in FIG. 2, having the desired overall thickness (about 10 mils to about 33 mils) as recited above. Depending on the desired overall thickness of the core and the thickness of the individual layers comprising the core, a multilayer core 12' can be formed by laminating together from about 2 to about 6 relatively thin sublayers.

The core layer 12 is generally provided with a surface treatment to reduce surface tension and thereby improve wetability with various inks or dyes which are subsequently applied to the treated surfaces of the core layer by any of various conventional printing methods such as gravure, offset flexography, screen printing, jet printing, web printing and the like. Various conventional methods such as abrasive or chemical treatment can be used for reducing surface tension and imparting good ink adhesion to the surfaces of the core layer 12.

The preferred method of treatment to improve ink receptivity, however, is by corona discharge wherein at least a portion of the outer surfaces of the core layer 12 is oxidized to a depth, for example, of up to about 20, and preferably up to about 10 Å. The corona discharge or other treatment is preferably sufficient to provide a surface tension of about 20 to about 75, and preferably from about 40 to about 72 dynes per square centimeter.

After the outer surfaces of the core layer 12 are treated and subsequently printed with desired indicia, protective outer layers 14 are laminately affixed to each side of the core layer to prevent the ink from wearing away during normal handling of the finished laminate card. The outer layers 14 are composed of a polymeric blend which exhibits good contact clarity for the desired thicknesses of the outer layers. Contact clarity, as used throughout this disclosure relative to the outer layers 14 of the lamina 10, means that the outer layers 14, after being laminated to the printed core layer 12, do not significantly distort the appearance of the printed indicia of the core layer.

Because the outer layers 14 are primarily provided to prevent the ink on the printed core layer 12 from wearing away, the outer layers are preferably relatively thin. While the thickness of the outer layer is not critical, to minimize optical distortion and to minimize the overall thickness of the lamina while providing adequate protection for the printed matter on the core layer, each of the outer layers is typically from about 0.5 mils to about 5 mils, and preferably from about 1 to about 3 mils thick.

The outer layers 14 can be affixed to the core layer by thermally fusing the layers together (FIG. 1), or a very thin layer 16 of a suitable conventional adhesive can be used to bond each of the outer layers 14 to respective sides of the core layer 12 (FIG. 2). Thermal fusion is generally preferred when small amounts of ink are used, whereas adhesives are generally desired when large amounts of ink are applied to the surface of the core. Obviously, for certain applications of the invention, it may be desirable to provide printed indicia on only one side of the card. In this case, it would only be necessary to treat and print on one side of the core or base layer 12 and to laminately affix only a single protective outer layer 14 to the printed side of the card.

The core layer 12 in a preferred embodiment is comprised of a polymeric blend including a polyvinyl chloride resin; a copolymer containing vinyl chloride and vinyl ester repeat units; one or more acrylic class polymers or copolymers; a chlorinated polyolefin; various solid tin stabilizers, various ester waxes, an oxidized polyethylene, and a tertiary organo phosphite.

The polyvinyl chloride resin is substantially a homopolymer of vinyl chloride monomer or a copolymer thereof containing substantially vinyl chloride repeat units, e.g., at least 70%, 80%, or 90% and up to 10, 20, or 30 percent of repeat units such as vinylidene-chloride, 1,2-dichloroethylene, and the like. Suitable polyvinyl chloride resins are commercially available from The Geon Company under the trademark "GEON", such as GEON® 110X334.

The copolymer of vinyl chloride and vinyl ester is generally any copolymer containing vinyl chloride and vinyl ester repeat units. The ester units of the copolymer introduce polarity to the polymeric blend thereby improving printability and adhesion. Suitable vinyl ester monomers include those wherein the ester group is saturated and contains from 2 to about 5 carbon atoms, such as in vinyl acetate (preferred), vinyl propionate, vinyl butyrate, and vinyl valerate.

It has been found that the ratio of vinyl chloride units to vinyl ester units in the copolymer has a significant effect on the printability of the articles formed from the polymeric blend of the invention. The amount by weight of the vinyl ester units in the copolymers is generally from about 5 to about 25 percent, desirably from about 7 to about 15 percent, and preferably from about 8 to about 12 percent by weight. A suitable vinyl chloride/vinyl acetate copolymer is commercially available from Occidental Chemical, such as "OXY 1710".

The one or more acrylic class polymers can be a homopolymer or copolymer, and or physical blends thereof. Examples of homopolymers include those of acrylic acid, methacrylic acid, acrylonitrile, methacrylonitrile, and the like, as well as copolymers thereof. Often, the acrylic class polymer is an ester, that is made from one or more alkyl (meth) acrylate wherein the alkyl group has from 1 to 8 carbon atoms, or is a copolymer made from two or more of said acrylates. Examples of suitable homopolymers include ethylacrylate, propylacrylate, butylacrylate, methyl methacrylate, and the like. A desired acrylate copolymer is made from butylacrylate and methyl methacrylate monomers as commercially available as KM-334 from Rohm & Haas Corporation. Another suitable acrylate copolymer is K-130 made by Rohm & Haas Corporation which is similar to KM-334 in that it is made from two or more acrylate monomers. When copolymers are utilized, the amount by weight of at least one of the repeat units is from 10% to 90% and desirably from 30% to 70% with the remaining one or more different repeat units being the difference. Optionally, the copolymers can include smaller amounts, e.g., from about 0.1 up to 30 or 50 percent of repeat units derived from various conjugated diene monomers having from 4 to 10 carbon atoms, for example, butadiene, isoprene, etc., and/or various monosubstituted aromatics having from 8 to 15 carbon atoms such as styrene, etc., with specific examples being ABS (acrylonitrile-butadiene-styrene) or MBS (methyl methacrylate-butadiene-styrene). Physical blends of two or more acrylic class polymers can also be utilized wherein the amount of at least one of the polymers is from about 10% to about 90% by wt. and desirably from about 30 to about 70% by wt., and the blend can also include small amounts of one or more other polymers, for example, up to 10, 20 or 30 weight percent, of polymers made from conjugated dienes having from 4 to 10 carbon atoms, e.g., butadiene, isoprene, hexadiene, etc., and/or various polymers made from aromatic monomers having from 8 to 12 carbon atoms such as vinyl-substituted aromatic monomers, e.g., styrene, alpha-methyl styrene, vinyl toluene, and the like, with styrene being preferred. A preferred acrylic polymer blend contains poly(methyl methacrylate), poly(butyl acrylate) and small amounts of polybutadiene with from about 1 to about 10 percent by weight and preferably from about 2 to about 4 percent by weight of the latter being preferred. A specific example of such a physical blend is DURASTRENGTH® 200, manufactured by Elf Atochem.

The one or more acrylic class polymers are highly desired in the present invention inasmuch as they impart good ultraviolet light stability to the credit card as well as impart better hinge life or flexible durability.

The chlorinated polyolefin can generally be any post-polymerization chlorinated, saturated polyolefin containing from about 20 to about 50 percent, and more preferably from about 30 to about 40 percent by weight of chlorine. Examples of suitable chlorinated polyolefins include polyolefins made from monomers containing from 2 to 4 carbon atoms with specific examples including chlorinated polyethylene, chlorinated polypropylene, and the like, with chlorinated polyethylene being preferred. The molecular weight can vary and is measured before the chlorine is added typically by its viscosity at 190° C. at 145 reciprocal seconds, e.g., from about 20,000 to about 30,000 centipoises. Examples of suitable commercially available chlorinated polyethylenes for use in the invention include TYRIN® 3615P and 3614A available from Dow Chemical.

The core layer 12 generally comprises a blend of a polyvinyl chloride resin, from about 50 to about 200, and preferably from about 75 to about 125 parts by weight of the vinyl chloride-vinyl ester copolymer per 100 parts by weight of the polyvinyl chloride resin; from about 10 to about 80, desirably from about 25 to about 60, and preferably from about 35 to about 50 parts by weight of the one or more acrylic polymers of copolymers per 100 parts by weight of the polyvinyl chloride resin; and from about 5 to about 100, desirably from about 7 to about 50, and preferably from about 10 to about 25 parts by weight of the chlorinated polyolefin per 100 parts by weight of the polyvinyl chloride resin.

An important aspect of the present invention relates to the utilization of solid tin heat stabilizers, as opposed to liquid stabilizers which tend to degrade upon processing as on calenders and the like. Solid tin stabilizers have also been found to give good ink adhesion, and alkyl-tin mercaptan carboxylates are preferred. Desirably, the alkyl group contains from 1 to 10 carbon atoms with butyl being preferred. Examples of specific tin stabilizers include butyltin mercaptide carboxylate and butyltin mercaptocarboxylate available as PROSPER® M36, manufactured by Baerlocher Corporation and as Mark 2255, manufactured by Witco Corporation, respectively. The total amount of such tin stabilizers is generally from about 0.5 to about 10, desirably from about 2.5 to about 7.5, and preferably from about 3 to about 6 parts by weight based upon 100 parts by weight of the polyvinyl chloride polymer.

Another important aspect of the present invention is that the core recipe contains at least one lubricant which is generally an ester wax and the same is well known to the art and to the literature. Suitable ester waxes include the glycerol type, the polymeric complex esters, the oxidized polyethylene type ester waxes, and the like, or combinations thereof. Metallic stearates such as barium, calcium, magnesium, zinc and aluminum stearate can also be used. A commercially available ester wax which can be utilized is a blend of mixed glycerol esters such as Loxiol 7111 produced by Henkel Corporation. Another suitable ester wax lubricant is a polymeric complex ester of a saturated fatty acid such as Loxiol G70, also produce by Henkel. Another type of lubricant ester wax is an oxidized homopolymer such as AC 629 A produced by Allied Signal.

It has been found that waxes are important to the present invention because if they are not utilized, a suitable, printable surface is generally not obtained. A plurality of waxes is typically utilized and the total amount thereof is generally from about 0.5 to about 10 parts by weight, desirably from about 1 to about 7 parts by weight, and preferably from about 1.5 to about 5 parts by weight per 100 parts by weight of the polyvinyl chloride.

Various organophosphites are also utilized in the core layer to improve the ink adhesion thereof as well as to improve color stability. The organophosphites are generally alkyl phenols wherein the alkyl group has from 1 to 10 carbon atoms. The organophosphites can either be liquid or solid and are generally utilized in amounts of from about 0.1 to about 5.0 and desirably from about 1.0 to about 2.0 parts by weight per 100 parts by weight of the polyvinyl chloride. Suitable organic phosphites include tertiary organo phosphites such as MARK C® manufactured by Witco Corporation, and THERMCHEK® 904 manufactured by Ferro Corporation.

The polymeric blend used for core layer 12 generally includes conventional amounts of conventional additives such as processing aids, heat stabilizers, antidegradants, pigments, colorants, UV stabilizers, and the like.

The thermoplastic core material of the present invention not only has good ink receptivity, but also good flexural durability, that is, extended flex life. As apparent from FIG. 4, the polymeric core blend "N" of the present invention has an extended flex life, that is, the number of flexes until break based upon the average of the machine direction and the transverse direction, of at least 6,000, desirably at least 8,000, and preferably at least 10,000 flexes as opposed to a much lower number of flexes achieved by prior art composition "A."

The one or more transparent outer layers 14 can be formed from a polymer blend which is very similar to the core blend since it has good compatibility therewith. Alternatively, the transparent outer layer can be a homopolymer or copolymer such as a polyvinyl chloride polymer as described hereinabove, a copolymer of vinyl chloride and a vinyl ester, e.g., ethylene-vinyl acetate, as described hereinabove, a polyester such as that formed by the condensation reaction of a diol containing from 1 to about 10 carbon atoms with a dicarboxylic acid containing from 3 to about 12 carbon atoms with polyethylene terephthalate being preferred, or a fluorine containing polymer Such as polyvinyl fluoride, polyvinyl difluoride, polyvinylidene fluoride, and the like. The use of fluoride polymers are highly desirable as the outer layer inasmuch as they have been found to improve the flex life or flexible durability, i.e., flexes to failure. Typically, as apparent from FIG. 4, the flex life of the overlay layer of a fluoride-containing polymer such as polyvinyl fluoride, (PVF) e.g., TEDLAR® manufactured by E. I. DuPont and Co., has a flex life of generally at least 15,000, desirably at least 30,000, and preferably at least 50,000 flexes based upon the average of the machine direction and the transverse direction. These values are unexpectedly much greater than the average flex life value of a conventional heretofore utilized overlay material "REG."

If a multicomponent polymeric blend is utilized, the components thereof are generally the same as set forth hereinabove and are thus hereby fully incorporated by reference. Desirably, the multicomponent polymeric blend for the overlay desirably contains a liquid tin stabilizer instead of a solid tin stabilizer because of better clarity and also utilizes a U.V. stabilizing agent or the like. Generally, any liquid tin stabilizer can be utilized, such as the various alkyl tin compounds, e.g. dibutyl tin mercaptans, wherein the alkyl portion has from 1 to 8 carbon atoms such as methyl or butyl, with dibutyltin bis(2-ethylhexylmercaptoacetate) being preferred which is available as T-31/PA1076 from Elf-Atochem Corporation.

Generally, any conventional U.V. stabilizer known to the art can be utilized such as Mark 1413, and a CAS, compound having a number of 1843-05-06 with a preferred stabilizer being 2-(2'-hydroxy-3,5'diteramylphenyl) benzotriazole, which is available as TINUVIN 328 from Ciba-Geigy Corporation.

The amounts of the various components of the overlay polymeric blend are generally different than that of the core layer primary because of contact clarity. Thus, the amount of the copolymer made from vinyl chloride and vinyl ester monomers is generally from about 10 to about 100 and desirably from about 25 to about 60 per 100 parts by weight of the PVC polymer. The amount of the one or more acrylic class polymers, copolymers, or blends thereof is generally from about 5 to about 30 and desirably from about 10 to about 20 per 100 parts by weight of the PVC polymer. The amount of the chlorinated polyolefins is generally about 5 to about 30 and desirably from about 10 to about 20 per 100 parts by weight of the PVC polymer. The total amount of the one or more lubricants such as the various ester waxes is generally about 0.2 to about 5 and desirably from about 0.5 to about 3 per 100 parts by weight of the PVC polymer. The amount of the liquid tin stabilizer is generally about 0.5 to about 12 and desirably from about 4 to about 10 per 100 parts by weight of the PVC polymer. The amount of the organophosphite is generally about 0.1 to about 1.5 and desirably from about 0.4 to about 1.2 per 100 parts by weight of the PVC polymer. The amount of the one or more U. V. stabilizers can vary widely depending upon the expected exposure of the card and generally is from about 0.1 to about 1.0 and desirably from about 0.2 to about 0.7 parts per 100 parts by weight of the polyvinyl chloride component.

As with the core layer, in addition to the above components, various other conventional additives in conventional amounts can be utilized in the overlay such as various pigments, colorants, antiblocking agents, optical brighteners, and the like.

The above-described polymeric overlay blends of the present invention also have improved average flex life as apparent from FIG. 4, especially in comparison with heretofore utilized overlay materials as more fully described hereinbelow. Thus, the overlay polymeric blend per se of the present invention has an average flex life (machine direction-transverse direction) of at least 6,000 flexes, desirably at least 7,000 flexes and preferably at least 8,000 flexes until break.

In addition to printable indicia, etc., generally physical indicia can be added to at least a portion of the core layer or sheet and subsequently covered by an overlay, or alternatively to the exterior face of the overlay. Such physical indicia includes magnetic strips, code bars, pictures, computer printed pictures, and other information. The plastic sheet lamina of the present invention can be further embossed with respect to identifying numbers, names, and the like with the embossing generally projecting the core and the overlay to a desired height above the remaining surface of the lamina.

Each of the blends (i.e, for the core layer and the outer layers) is prepared by mixing the disclosed compounds in the amounts set forth above using any of various known methods and apparatus. For example, a Banbury mixer can be used to flux the ingredients into a hot mass at a temperature of from about 240° F. to about 350° F. The blend is then dropped out of the Banbury mixer and conveyed to, for example, a two-roll mill. The two-roll mill is used for additional fluxing and to enable continuous feed strip to, for example, a calendering apparatus. The calendering apparatus can, for instance, be a multiple-roll inverted calender which is used to form the blends into sheets having the desired thicknesses. The sheet material leaving the calendering apparatus can be wound up into rolls or cut into sheets.

In accordance with a preferred aspect of the invention, both the core layer sheets and the interior surface of the outer layer sheets are preferably corona treated as noted hereinabove to improve printability and to improve adhesion at the interface between the layers of the lamina 10.

Prior to lamination the core sheets are printed on one or both sides with the desired ink and/or indicia dye on at least a portion thereof. Thereafter, an outer layer sheet is laminated to each printed side of the core layer 12 by pressing the layers together under the application of heat with or without adhesive between the layers.

During the lamination process, physical indicia such as magnetic strips or pictures can also be simultaneously laminated with or without adhesives to the core sheets (not shown). Alternatively, the physical indicia can be laminated, with or without adhesives in a subsequent operation to the exterior face of the overlay. The compositions of the core 12 and outer layer(s), after being suitably calendered or extruded into sheets of the desired thickness and after application of inks, dies, or other printing agent, can be laminated together at relatively low temperatures, such as below 300° F., for example, from about 270° F. to 290° F., to produce an extended life credit card having superior flexural durability. However, compositions which do not contain the vinyl chloride-vinyl ester copolymer or solid tin stabilizers of the present invention must be laminated at much higher temperatures such as 320° F. to 350° F. which cause degradation and discoloration of the printed subject matter contained on the core. Moreover, processing at such high temperatures also causes distortion of the magnetic strip.

The sheets can then be cut into individual cards, embossed with a name, account number or other desired information. The raised surfaces of the embossed information can be tipped with ink if desired.

The lamina of the present invention containing either one or two overlays can generally be utilized for any type of printed identification plastic cards, desirably monetary identification cards such as credit cards, bank cards, bus cards, health care cards, telephone cards, and the like as well as other types of identification cards such as driver's license cards, immigration cards, library cards, security cards, and the like.

A better understanding of the invention can be had by reference to the following illustrative examples.

EXAMPLES

A polymeric blend for the core layer 12 was prepared in accordances with the following recipe.

| CORE BLEND RECIPE (N) | | | |
|---|---|---|---|
| Commercial Name | CAS # | Common Name | Parts by Weight |
| Geon 110X334 | 9002-86-2 | Poly(vinyl-chloride) | 100 |
| Oxychem 1710 | 9003-22-9 | PVC suspension copolymer resin | 100 |
| PD1006 (Durastrength 200) | 33031-74-2 | Acrylic polymer | 21 |
| CPE 3615P | 064754-90-1 | Chlorinated polyethylene resin | 20 |
| K-130 | Trade secret | Acrylic Copolymer | .67 |
| Prosper M36 | 76-06-8 | Butyltin mercaptide carboxylate | 2.67 |
| Mark 2255 | Trade secret | Butyltin mercapto carboxylate | 2.0 |
| Loxiol 7111 | NA Mixture | Mixed glycerol esters | 2.0 |
| Loxiol G70 | NA Mixture | Polymeric complex ester | .80 |
| AC 629A | 68441-17-8 | Oxidized polyethylene | 0.20 |
| Mark C | Trade secret | Teritiary organo phosphite | 1.33 |

The preparation of a plastic sheet from the above core blend recipe was as follows: The PVC and the vinyl chloride-vinyl acetate resins were conveyed to a holding hopper located above a Banbury mixer. These resins are then metered into the hopper in the proper amounts as required by the recipe. The weighed resins were then dropped into the Banbury mixer. The additional core blend ingredients were then each weighted individually in sequence in a batch tub and then dumped into the Banbury. The core blend was then mixed and fluxed into a batch of plastic. At the proper temperature (275°–325° F., 135°–163° C.) the batch of properly fluxed core plastic was dropped out of the Banbury into a conveying hopper and conveyed to a two roll dump mill. At the dump mill additional mixing was conducted (if required). The core plastic was then strip conveyed to a feed mill. The feed mill was used for some additional fluxing and to enable a continuous feed strip to be fed into a calender. The calender had four metal rolls in the configuration of an inverted "L". The metal rolls formed the fluxed core plastic into a continuous web that when stripped from the bottom calender roll had the required thickness, width and surface. The core plastic was then cooled into a flat web that was cut into suitable sized sheets.

A polymeric overlay blend for outer layer 14 was prepared in accordance with the following recipe.

OVERLAY BLEND (R)

| Commercial Name | CAS # | Common Name | Parts by Weight |
|---|---|---|---|
| Geon 110X334 | 9002-86-2 | Poly(vinylchloride) | 100 |
| Oxychem 1710 | 9003-22-9 | PVC suspension copolymer resin | 40 |
| PD1006 (Durastrength 200) | 33031-74-2 | Acrylic polymer | 16 |
| CPE 3615P | 064754-90-1 | Chlorinated polyethylene resin | 16 |
| K-130 | Trade secret | Acrylic Copolymer | 2.0 |
| T-31/PA1076 | 10584-96-2 | Dibutyltin Bis(2-ethylhexylmercaptoacetate) | 7.2 |
| Loxiol 7111 | NA Mixture | Mixed Glycerol Esters | 0.8 |
| Loxiol G70 | NA Mixture | Polymeric Complex Esters | 0.3 |
| AC 629A | 68441-17-8 | Oxidized Polyethylene esters | 0.16 |
| Mark C | Trade secret | Tertiary Organo Phosphates | 0.8 |
| Tinuvin 328 | 25973-55-1 | 2-(2'-Hydroxy-3',5' Di-teramylphenyl) benzotriazole | 0.48 |

The above ingredients in the indicated amounts were added to a Henschel mixer and mixed at 70° to 120° F. (21° to 49° C.) for 2 minutes, until all ingredients were blended. The resulting powder blend was dumped out of the Henschel mixer into a holding hopper. The overlay powder blend was then metered into a Farrell continuous mixer and fluxed. The fluxed plastic was cut into pieces and then conveyed to two-rolled mill. The overlay composition was then milled to achieve additional fluxing and to enable a continuous feed strip to be fed to a calender.

Subsequently, the calender overlay material was laminated, cut, and applied to a core layer containing printing indicia thereon. Lamination equipment which was utilized included a top and bottom press platens and a top and bottom chrome polish plates. The heating press platens were both heated to approximately 290° F. (143° C.). A core-overlay utilizing sheets made in a manner as noted above was plied in a configuration as set forth in FIG. 1. The core with overlay sheets on each side thereof was placed between the two high polished chrome plates and a hydraulic pressure of approximately 5 tons applied for approximately 3 minutes to allow proper lamination of each overlay to the core plastic. The press was then opened for a short period of time and the lamina rapidly transferred to cooling press platens, i.e., two opposed press platens and also two opposed polish plates at a temperature of approximately 100° F. (38° C.). The cooling platens were closed and a hydraulic pressure of approximately 7 tons applied for about 3 minutes. The cooling press platens were then opened and the lamina removed. The resulting lamina was then die cut into standard size credit cards for flex life and other testing.

In a similar manner as described hereinabove, various laminas were prepared from core and overlay sheets, the recipes of which are set forth below.

FLEX LIFE TESTS KEY TO SAMPLE DESCRIPTION

| | |
|---|---|
| OVERLAY = REG | A PVC/PVA Copolymer Overlay Used by Security Credit From American Hoerst .003 Gauge. |
| PVF | Poly Vinyl Fluoride "Tedlarl" Dupont Adhesive Coated .0015 Gauge. |
| CORE = A | A Lead Stabilized Print Stock. |
| B | A Homopolymer Liquid Tin Stabilized Print Stock. |
| C | A Solid Tin Stabilized Copolymer Print Stock. |
| N | The Extended Life Core Blend Recipe Set Forth Above. |

The above noted comparative core recipes are set forth in the following table and the flex life of various lamina are set forth in the Flex Life Table.

COMPARATIVE CORE RECIPES

| Trade Names | CAS # | Common Name | Recipe A | Recipe B | Recipe C |
|---|---|---|---|---|---|
| Geon 110X334 | 9002-86-2 | Poly(Vinyl Chloride) Homopolymer | 100.00 | 100.00 | 100.00 |
| Oxychem 1710 | 9003-22-9 | PVC Suspension Copolymer Resin | 50.00 | — | 100.00 |
| KM-334 | 25852-37-3 | Acrylic Modifier p(BA/MMA) | — | — | 29.33 |
| White Lead | 1319-46-6 | Lead Carbonate Hydroxide | 6.50 | — | — |
| | 56189-09-4 | Dibasic Lead Stearate | | | |
| Calcium Stear. | 1592-23-0 | Ca(C18H25O2)2 | .50 | — | — |
| Prosper M-36 | 78-06-8 | Butyltin Mercaptide Carboxylate | — | — | 2.67 |
| T-31/PA1076 | 10584-98-2 | Dibutyltin Bis(2-Ethythexylmercapmacetate | — | 4.33 | — |

-continued

| COMPARATIVE CORE RECIPES | | | | | |
|---|---|---|---|---|---|
| Trade Names | CAS # | Common Name | Recipe A | Recipe B | Recipe C |
| Mark 2255 | Trade Secret | Butyltin Mercaptocarboxylate | — | — | 2.00 |
| Loxiol 7111 | NA Mixture | Mixed Glycerol Esters | — | — | 2.00 |
| K-175 | 27136-15-8 | P(BA/MMA/STY) Process Aid | — | 1.33 | — |
| Loxiol G70 | NA Mixture | Polymeric Complex Ester | — | — | .80 |
| 56-053 | 68441-17-8 | Oxidized Polyethylene | — | — | .20 |
| Martinol OL107 | 21645-51-2 | Aluminum Trihydrate | — | 6.67 | — |
| MARK C/904 | Trade Secret | Tertiary % Organo Phosphate | .50 | — | 2.00 |
| BTA-753 | 25053-09-2 | p[BD/MMA/STY] | 21.00 | 14.67 | — |
| PR-700 | NA Mixture | Aluminum Stearate + Additives | — | 1.33 | — |
| Superflex 200 | 41-34-1 | Coated Precipitated $CaCO_3$ | — | 4.44 | - |

The flex life test results were obtained utilizing a testing machine which essentially comprise two jaws approximately 2⅛ inches apart which were then contracted towards each other to a distance of 1¾ inches with the indicated lamina located therebetween. The jaws were subsequently withdrawn from one another so the credit card once again lay flat. This procedure constituted one flex cycle.

| FLEX LIFE TABLE | | | | | |
|---|---|---|---|---|---|
| | | | | FLEXES TO FAILURE | |
| Example Code | Overlay Material | Core Layer | Thickness | Machine Direction | Traverse Direction |
| AA | REG | A | 0.031 | 3000 | 3500 |
| AB | PVF | A | 0.030 | 9000 | 4000 |
| BA | REG | B | 0.029 | 3500 | 2000 |
| BB | PVF | B | 0.028 | 6300 | 2300 |
| CA | REG | C | 0.028 | 5000 | 1500 |
| CB | PVF | C | 0.027 | 16000 | 4500 |
| DA | REG | N | 0.029 | 5500 | 10500 |
| DB | PVF | N | 0.027 | 28500 | 28500 | lamina having an average flex life (machine and transverse direction) of at least 5,000, desirably at least 6,000, and preferably at least 8,000 flexes. When the fluoride-containing polymer was substituted as the overlay material, flex life is still further improved and generally is at least 10,000, desirably at least 20,000 and preferably at least 25,000 flexes to break.

Figure 4:
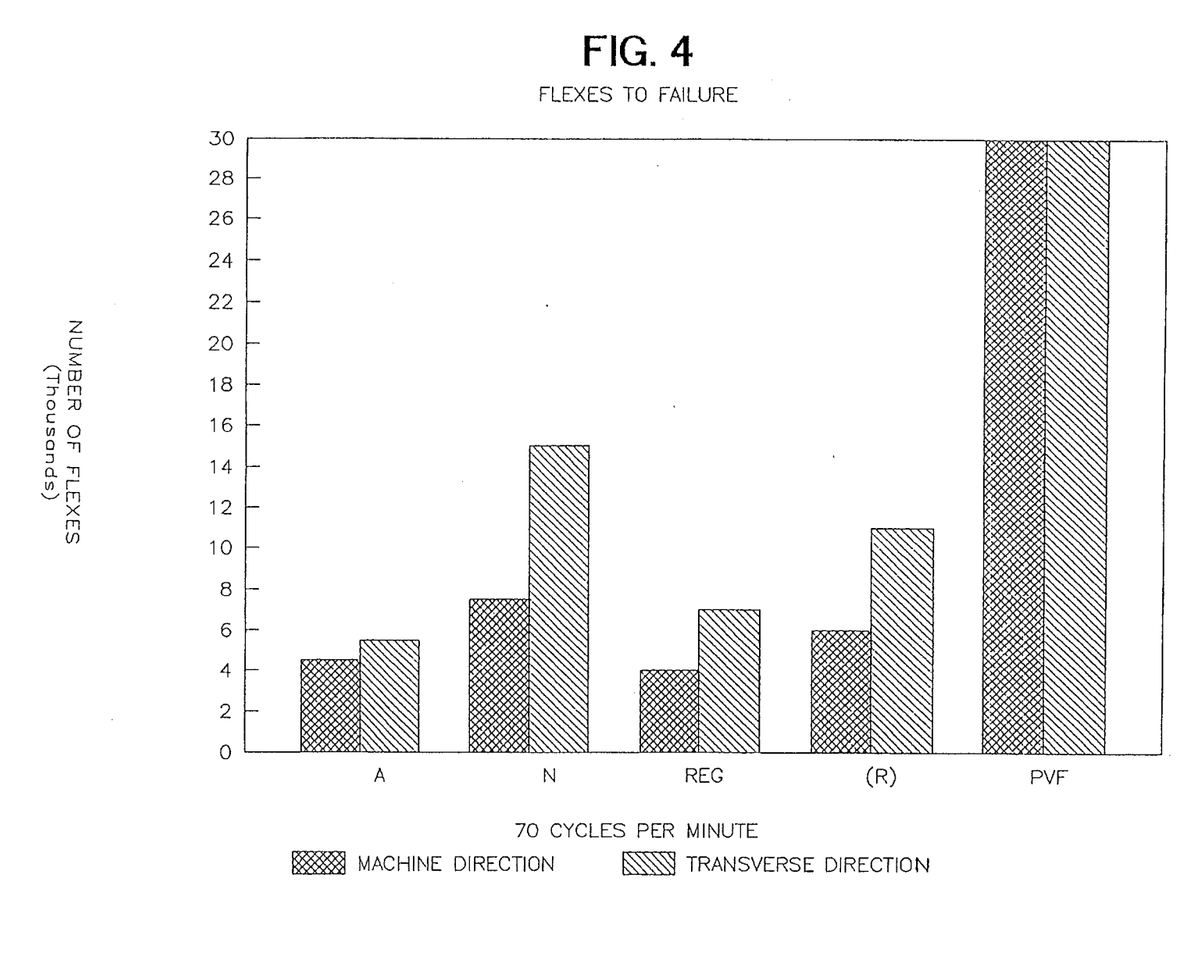
FIG. 4 is a graph showing the comparison of flex life of prior art plastic cores versus the polymeric blend cores of the present invention as well as a comparison of flex life of prior art polymer blend overlay versus the polymer blend overlays and the fluorine polymer overlays of the present invention.

FIG. 4 relates to a comparison of the flex life of solely the core layer made from Recipe A with the flex life of solely the core material made from Recipe N of the present invention. FIG. 4 also sets forth a comparison of flex life of the overlay per se made from a conventional, i.e., REG, formulation versus the polymeric overlay formulation R of the present invention as well as the polyvinyl fluoride (PVF) overlay. The graphical information set forth in FIG. 4 is numerically set forth in the following table.

| COMPARATIVE CORE AND OVERLAY FLEX LIFE TABLE | | | | | |
|---|---|---|---|---|---|
| Description | Formulation | Thickness | Machine Dir. | Transverse Dir. | Avg. Flex Life |
| 1. CORE | A | 0.026 | 4500 | 5500 | 5,000 |
| 2. CORE | N | 0.026 | 7500 | 15000 | 11,250 |
| 3. OVERLAY | REG | 0.026 | 4000 | 7000 | 5,500 |
| 4. OVERLAY | R | 0.027 | 6000 | 11000 | 8,500 |
| 5. OVERLAY | PVF | 0.028 | 65000 | 65000 | 65,000 |

Figure 3:
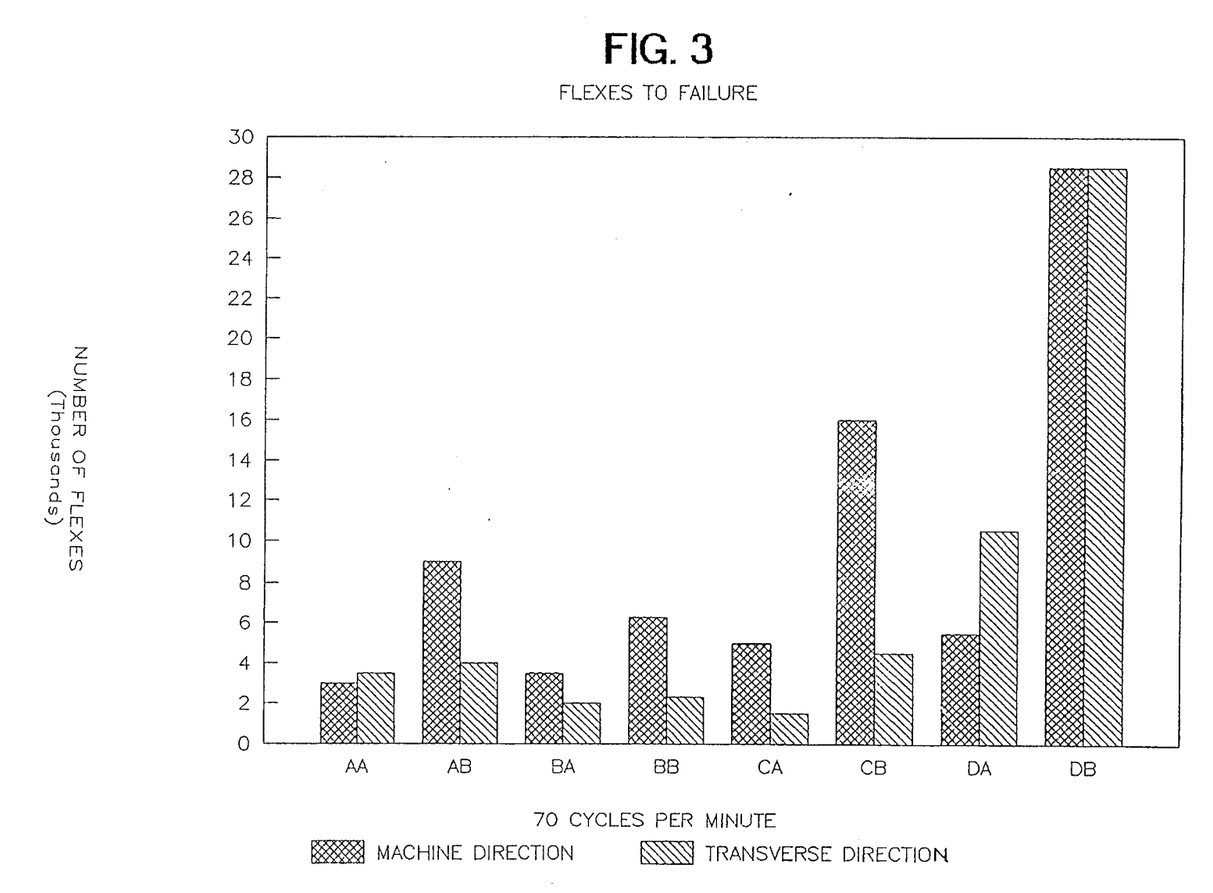
FIG. 3. is a comparative graph showing the flex life of a laminated credit card utilizing prior art core compositions and overlay compositions versus core and overlay compositions of the present invention.

Items 3, 4 and 5 were laminated to the core thickness so flex tests could be performed.
3 = 13 plies of .002 gauge
4 = 9 plies of .003 gauge
5 = 19 plies of .0015 gauge As apparent from the above Table and FIG. 3, the utilization of a fluoride polymer such as TEDLAR® as the overlay resulted in dramatic improvement in the flex life of the lamina even though it was only utilized in the outer two layers. When both the polymer blend core material of the present invention was utilized in the core layer and the fluoride polymer utilized in the overlay layers, Example DB, dramatic improvements in the flex life was obtained. Accordingly, laminas made in accordance with the present invention containing the polymer core blend and the modified polymer blend as the overlay generally produce a As apparent from FIG. 4 and the above comparative table, the core formulation per se of the present invention as well as the overlay formulations per se of the present invention have much longer flex life than previous heretofore utilized formulations.

While in accordance with the Patent Statutes, the best mode and preferred embodiment has been set forth, the scope of the invention is not limited thereto, but rather by the scope of the attached claims.

What is claimed is:

1. In a laminated article comprising a thermoplastic core having ink and/or dye on at least one surface thereof and at least one thermoplastic transparent overlay bound to said core, the improvement wherein said core comprises a blend of;
    a resin which is a polyvinyl chloride polymer or copolymer containing at least 70 percent vinyl chloride repeat units therein;
    from about 50 to about 200 parts by weight per 100 parts by weight of said resin of a copolymer of vinyl chloride and a vinyl ester wherein the ester group contains from 2 to 5 carbon atoms;
    from about 25 to about 60 parts by weight per 100 parts by weight of said resin of one or more acrylic polymers, or copolymers, or blends thereof;
    from about 10 to about 100 parts by weight per 100 parts by weight of said resin of a chlorinated polyolefin wherein the repeat unit of said polyolefin has from 2 to 4 carbon atoms;
    from about 0.5 to about 10 parts by weight per 100 parts by weight of said resin of one or more solid alkyl tin stabilizers,
    and from about 0.5 to about 10 parts by weight per 100 parts by weight of said resin of one or more ester waxes.

2. A laminated article according to claim 1, wherein said overlay is (a) a polymer blend of
    a resin which is a polyvinyl chloride polymer or copolymer containing at least 70 percent vinyl chloride repeat units therein;
    from about 10 to about 100 parts by weight per 100 parts by weight of said resin of a copolymer of vinyl chloride and a vinyl ester wherein the ester group contains from 2 to 5 carbon atoms;
    from about 5 to about 30 parts by weight per 100 parts by weight of said resin of one or more acrylic polymers, or copolymers, or blends thereof;
    from about 10 to about 30 parts by weight per 100 parts by weight of said resin of a chlorinated polyolefin wherein the repeat unit of said polyolefin has from 2 to 4 carbon atoms;
    from about 0.5 to about 12 parts by weight per 100 parts by weight of said resin of one or more alkyl tin stabilizers,
    from about 0.5 to about 5 parts by weight per 100 parts by weight of said polyvinyl chloride resin of one or more ester waxes,
    and from about 0.1 to about 1.5 parts by weight per 100 parts by weight of said resin of one or more ultraviolet light stabilizers; or
    b) a polyvinyl chloride or a copolymer of a polyvinyl chloride polymer containing at least 70 percent vinyl chloride repeat units therein, or a copolymer of vinyl chloride and a vinyl ester wherein said ester portion contains from 2 to 5 carbon atoms, or a polyester, or a fluorine-containing polymer.

3. A laminated article according to claim 2, wherein said core copolymer and said overlay copolymer of said vinyl chloride and said vinyl ester is polyvinyl chloride/vinyl acetate wherein the amount of said vinyl acetate units is from about 7 to about 15% by weight, wherein said core and said overlay chlorinated polyolefin is chlorinated polyolefin wherein the amount of said chlorination is from about 20 to about 50% by wt., wherein said alkyl group of said core alkyl tin stabilizer has from 1 to 10 carbon atoms and wherein the amount of said core tin stabilizer is from about 2.5 to about 7.5 parts by weight.

4. A laminate article according to claim 3, wherein said overlay is polyvinyl fluoride, wherein said laminated article is a monetary identification card, and wherein the laminated article has a flex life of at least 10,000 flexes.

5. A printable plastic substrate, comprising:
    a sheet of a polymeric blend comprising;
    resin which is a polyvinyl chloride polymer or copolymer containing at least 70 percent vinyl chloride repeat units therein;
    from about 50 to about 200 parts by weight per 100 parts by weight of said resin of a copolymer of vinyl chloride and a vinyl ester wherein the ester group contains from 2 to 5 carbon atoms;
    from about 25 to about 60 parts by weight per 100 parts by weight of said resin of one or more acrylic polymers, or copolymers, or blends thereof;
    from about 10 to about 100 parts by weight per 100 parts by weight of said resin of a chlorinated polyolefin wherein the repeat unit of said polyolefin has from 2 to 4 carbon atoms;
    from about 0.5 to about 10 parts by weight per 100 parts by weight of said resin of one or more solid alkyl tin stabilizers,
    and from about 0.5 to about 10 parts by weight per 100 parts by weight of said resin of one or more ester waxes,
    said polymeric sheet having an average machine direction—traverse direction flex life of at least 8,000 flexes.

6. A printable plastic substrate according to claim 5, wherein said copolymer of vinyl chloride and a vinyl ester is polyvinyl chloride/vinyl acetate wherein the amount of the vinyl ester units is from about 7 to about 15% by weight, wherein the amount of said polyvinyl chloride/vinyl acetate copolymer is from about 75 to about 125 parts by weight, wherein said alkyl group of said solid alkyl tin stabilizer has from 1 to 10 carbon atoms, wherein the amount of said solid tin stabilizer is from about 2.5 to about 7.5 parts by weight, wherein said chlorinated polyolefin is chlorinated polyethylene wherein the amount of said chlorine is from about 30 to about 40 percent by weight, and wherein the amount of said chlorinated polyethylene is from about 10 to about 25 parts by weight.

7. A printable plastic substrate according to claim 6, wherein said flex life is at least 10,000 flexes.

8. A transparent flexible polymeric overlay, comprising: a thermoplastic sheet of a polymeric blend of:
    a resin which is a polyvinyl chloride polymer or copolymer containing at least 70 percent vinyl chloride repeat units therein;
    from about 10 to about 100 parts by weight per 100 parts by weight of said resin of a copolymer of vinyl chloride and a vinyl ester wherein the ester group contains from 2 to 5 carbon atoms;
    from about 5 to about 30 parts by weight per 100 parts by weight of said resin of one or more acrylic polymers, or copolymers, or blends thereof;
    from about 10 to about 30 parts by weight per 100 parts by weight of said resin of a chlorinated polyolefin wherein the repeat unit of said polyolefin has from 2 to 4 carbon atoms;
    from about 0.5 to about 12 parts by weight per 100 parts by weight of said resin of one or more alkyl tin stabilizers, from about 0.5 to about 5 parts by weight per 100 parts by weight of said resin of one or more ester waxes, and from about 0.1 to about 1.5 parts by weight per 100 parts by weight of said resin of one or more ultraviolet light stabilizers, said sheet having an average machine direction—transverse direction flex life of at least 6,000 flexes.

9. A transparent flexible polymeric overlay according to claim 8, wherein said copolymer of vinyl chloride and a vinyl ester is polyvinyl chloride/vinyl acetate wherein the amount of vinyl ester units is from about 7 to 15% by weight and wherein the amount of said polyvinyl chloride/vinyl acetate copolymer is from about 25 to about 60 parts by weight, wherein said chlorinated polyolefin is chlorinated polyethylene wherein the amount of chlorination is from about 30 to about 40 percent by weight and wherein the amount of said chlorinated polyethylene is from about 10 to about 20 parts by weight, wherein the amount by weight of said one or more alkyl tin stabilizers is from about 4 to about 10 parts by weight, wherein the amount by weight of said one or more waxes is from about 0.5 to about 3 parts by weight, and wherein said sheet flex life is at least 7,000 flexes.

10. A laminated article according to claim 1, wherein said overlay is polyvinyl fluoride.

\* \* \* \* \*